United States Patent
Sevindik

(10) Patent No.: US 12,389,265 B2
(45) Date of Patent: Aug. 12, 2025

(54) ADAPTING TCP IN SAS-CONTROLLED CBRS NETWORKS

(71) Applicant: Charter Communications Operating, LLC, St. Louis, MO (US)

(72) Inventor: Volkan Sevindik, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 18/592,257

(22) Filed: Feb. 29, 2024

(65) Prior Publication Data

US 2024/0205739 A1   Jun. 20, 2024

Related U.S. Application Data

(63) Continuation of application No. 17/528,888, filed on Nov. 17, 2021, now Pat. No. 11,924,678.

(51) Int. Cl.
*H04W 28/02* (2009.01)
*H04L 69/16* (2022.01)
*H04W 28/14* (2009.01)

(52) U.S. Cl.
CPC ......... *H04W 28/0289* (2013.01); *H04L 69/16* (2013.01); *H04W 28/14* (2013.01)

(58) Field of Classification Search
CPC ............ H04W 28/0289; H04W 28/14; H04W 28/0273; H04W 28/0278; H04L 69/16; H04L 47/193; H04L 47/27
See application file for complete search history.

(56) References Cited

U.S. PATENT DOCUMENTS

| | | | |
|---|---|---|---|
| 7,425,181 B2 | 9/2008 | Nakagaito et al. | |
| 7,609,640 B2 | 10/2009 | Ahuja et al. | |
| 7,724,750 B2 | 5/2010 | Swami et al. | |
| 8,228,815 B2 | 7/2012 | Keromytis et al. | |
| 2008/0037420 A1 | 2/2008 | Tang | |
| 2010/0182905 A1 | 7/2010 | Matsushita et al. | |
| 2011/0212730 A1* | 9/2011 | Wennstrom | H04L 5/0091 455/507 |
| 2012/0197898 A1 | 8/2012 | Pandey et al. | |

(Continued)

OTHER PUBLICATIONS

Lorincz et al, "Comprehensive Overview of TCP Congestion Control in 5G Networks: Research Challenges and Future Perspectives" Research Challenges and Future Perspectives. Sensors 2021, 21, 4510. https://doi.org/10.3390/s21134510 (published on Jun. 30, 2021) (Year: 2021).*

*Primary Examiner* — Sun Jong Kim
(74) *Attorney, Agent, or Firm* — Patent Beach PC

(57) ABSTRACT

System and method for adapting transmission control protocol (TCP) operation between a provider equipment (PE) node apparatus and a plurality of user devices in data communication including receiving a spectrum grant, creating at least one beam for each user device based on the spectrum grant and a number of the plurality of user devices being serviced by the PE node apparatus, initializing data representative of at least one profile for storing slow-start-related information for each beam of the at least one beam servicing a TCP upload or TCP download connection, and providing network services to each of the plurality of user devices via each beam of the at least one beam supporting the respective TCP upload and TCP download connections.

20 Claims, 2 Drawing Sheets

(56) References Cited

U.S. PATENT DOCUMENTS

| | | |
|---|---|---|
| 2013/0145236 A1 | 6/2013 | Baker |
| 2014/0029620 A1 | 1/2014 | Zheng et al. |
| 2015/0163142 A1 | 6/2015 | Pettit et al. |
| 2016/0380898 A1 | 12/2016 | Englund et al. |
| 2017/0019338 A1 | 1/2017 | Song et al. |
| 2017/0332392 A1 | 11/2017 | Miao et al. |
| 2018/0098282 A1 | 4/2018 | Hong et al. |
| 2018/0309494 A1* | 10/2018 | Zhu ............ H04B 7/0456 |
| 2019/0326976 A1* | 10/2019 | Hu ............. H04W 36/06 |
| 2019/0394678 A1 | 12/2019 | Syed et al. |

* cited by examiner

AT EACH CBSD GNB/ENB:

- REGISTER WITH SAS & RECEIVE SPECTRUM GRANT FROM SAS
- CREATE AT LEAST ONE BEAM FOR EACH UE CONNECTING/CONNECTED
- CREATE SS PROFILE FOR EACH BEAM
- BEGIN PROVIDING NETWORK SERVICES TO CONNECTED UE VIA TCP
- MODIFY BEAM ALLOCATION AS APPROPRIATE                        210

AT EACH CBSD GNB/ENB, FOR EACH TCP CONNECTION/BEAM, MONITOR AND STORE IN SS PROFILE:
- SS PACKET SIZE (E.G., CWIN),
- ACKS/NACKS COUNT FOR EACH SS PACKET SIZE,
- UE REPORTED BEAM CHANNEL QUALITY,
- TOTAL DATA CARRIED PER RELEVANT TIME PERIOD,
- AVERAGE MODULATION USED FOR BEAM,
- AND/OR AVERAGE LATENCY SUPPORTED BY TCP CONNECTION/BEAM     220

AT EACH CBSD GNB/ENB, FOR UE TCP CONNECTIONS SUPPORTED BY MULTIPLE BEAMS:

- OPTIONALLY SCALE NOMINAL SS PACKET SIZE INCREASES/DECREASES ACCORDING TO NUMBER OF BEAMS SUPPORTING TCP CONNECTIONS

- OPTIONALLY REDUCE SIZE OF SS PACKET SIZE INCREASES IF AVERAGE BEAM MODULATION LEVELS EXCEED A FIRST THRESHOLD LEVEL

- OPTIONALLY REDUCE SIZE OF SS PACKET SIZE DECREASES IF AVERAGE BEAM MODULATION LEVELS ARE BELOW A SECOND THRESHOLD LEVEL    230

AT EACH CBSD GNB/ENB RECEIVING A POWER DOWN MESSAGE FROM SAS:

- IDENTIFY CONNECTED UE AND CORRESPONDING LAST SUCCESSFUL TCP SS PACKET SIZE AND CHANNEL QUALITY (E.G., HIGH NUMBER OF ACKS, NO NACKS) FOR UPLOAD (UL) AND DOWNLOAD (DL) TCP CONNECTIONS

- MAINTAIN DL TCP TRANSMISSION TO EACH UE AT CORRESPONDING LAST SUCCESSFUL DL TCP SS PACKET SIZE UNTIL RESPECTIVE DL GNB/ENB BUFFERS EMPTY

- MAINTAIN UL TCP TRANSMISSION FROM EACH UE AT CORRESPONDING LAST SUCCESSFUL UL TCP SS PACKET SIZE UNTIL RESPECTIVE UE UL BUFFERS EMPTY

- POWER DOWN CBSD ANTENNAS FOR EACH UE AFTER RESPECTIVE UL/DL BUFFERS EMPTY                                                  240

FIG. 2      200

ADAPTING TCP IN SAS-CONTROLLED CBRS NETWORKS

PRIORITY

This application is a continuation of and claims priority to co-owned and co-pending U.S. patent application Ser. No. 17/528,888 of the same title filed on Nov. 17, 2021, and issuing as U.S. Pat. No. 11,924,678 on Mar. 5, 2024, which is incorporated herein by reference in its entirety.

FIELD OF THE DISCLOSURE

The present disclosure relates generally to transmission control protocol (TCP) and, more particularly, to a method and apparatus for adapting a TCP data packet size selection mechanism.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Transmission Control Protocol (TCP) is a well known data transmission protocol used by many communications networks including wireless networks, such as to transmit data between a core network and a base station, eNodeB, gNodeb and the like in wireless communications with user equipment (UE) receiving network services therefrom. For example, many Mobile Web Services (MWS) use HTTP/TCP/IP (Hyper Text Transfer Protocol/Transmission Control Protocol/Internet Protocol) for communication between a web service client and a service provider, which includes the radio link.

In an attempt to control network congestion, TCP implements congestion avoidance and control algorithms. For example, at the onset of communication between a network proxy and a client, TCP implements a "slow-start" algorithm in which an initial data packet size is used for data transmission (e.g., from client to network proxy), wherein the transmission data packet size used for a next data packet is doubled in response to acknowledged successful reception (ACK) of a current packet, and halved in response to acknowledged unsuccessful reception (NACK) of the current packet (or a timeout). While this mechanism works reasonably well, it does not contemplate opportunities for improvement, or relevant limitations, associated with certain network topologies.

SUMMARY

Various deficiencies in the prior art are addressed by systems, methods, mechanisms, and apparatus to rapidly flush CBSD buffers in response to a CBSD shutdown command or spectrum grant withdrawal. Various embodiment modify cwin size, including embodiments where cwin size is also modified in accordance with a number of MIMO antennas used by a CBSD for beamforming.

In one embodiment, a method is provided for adapting Transmission Control Protocol (TCP) traffic flows at a provider equipment (PE) node configured to provide backhaul services to endpoint devices communicating with the PE node via respective wireless channels, the method comprising: at the PE node, in response to a requirement to cease transmitting on wireless channels supporting current TCP connections with endpoint devices, transmitting messages to the endpoint devices configured to cause the endpoint devices to continue transmitting currently buffered uplink (UL) data to the PE node via respective UL TCP connections using corresponding last successful TCP congestion window (cwin) sizes, and transmitting currently buffered downlink (DL) data from the PE node to the endpoint devices via respective DL TCP connections using corresponding last successful TCP cwin sizes.

In another embodiment, where the PE node comprises a CBSD transmitting data to endpoint devices connected thereto via DL TCP connections supported by respective wireless channels comprising one or more beams, the method further comprises: for each DL TCP connection supported by a wireless channel comprising more than one beam, modifying a corresponding TCP slow start mechanism by increasing initial slow start packet size and slow start packet size increment.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 2 depicts a flow diagram of methods according to various embodiments.

Figure 1:
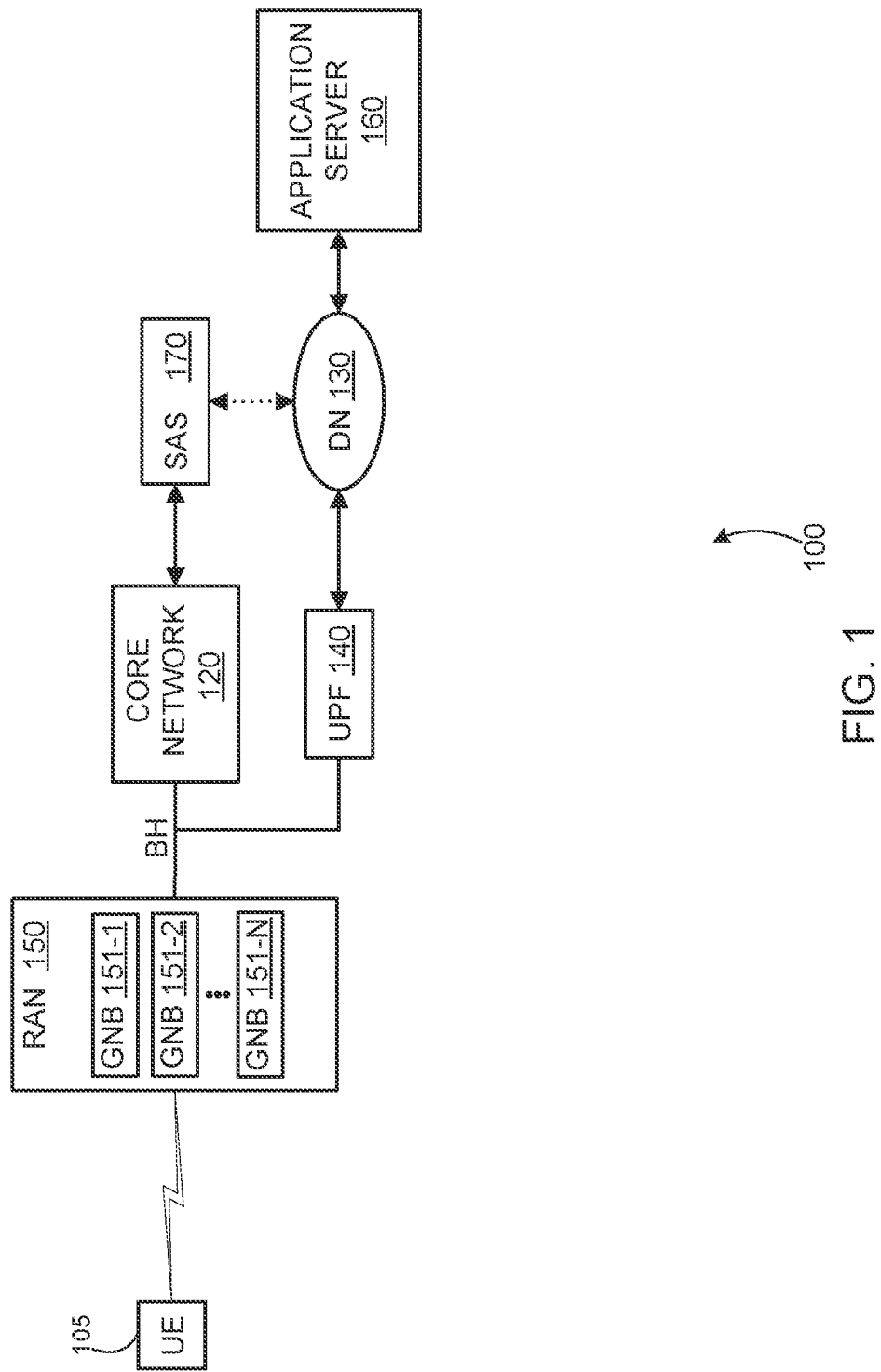
FIG. 1 depicts a high-level block diagram of a network services architecture benefiting from various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a system, method, mechanism, and apparatus by which a communications node (e.g., base station, eNodeB (eNB), gNodeB (gNB), radio access network ((R)AN) and the like) configured to provide network services to various user equipment (UE) via TCP connections supported by one or more respective antennas/beams (e.g., MIMO antennas) is configured to adapt the operation of such TCP connections to increase data throughput, reduce data loss, and generally improve the network services provided to the UE.

While the various embodiments will generally be described within the context of gNB communication nodes within a RAN of a 5G mobile network, the various embodiments are applicable to any communication node within any type of network utilizing TCP connections, such as eNB communication nodes within a 4G/LTE mobile network, wireless access points (APs) within an 802.11xx network and the like.

FIG. 1 depicts a simplified block diagram of a network services architecture benefiting from various embodiments. The network services architecture 100 depicted in FIG. 1 comprises a core network 120 such as a 5G core network supporting various core network functions (NFs) such as described in relevant standards documents such as the 3GPP standards for 5G (e.g. 3GPP 23.501 and 23.502). One or more access or core data networks (depicted as data networks (DN) 130) may be used to connect various remote or endpoint devices/services (such as application server (AS) 160) to the 5G network via user plane functions (UPFs) such as UPF 140.

Various UE 105 may obtain access to the 5G network via gNB formed as logical nodes or groupings of resources at one or more radio access networks (R)Ans such as RAN 150. The gNB are depicted herein as gNB 151-1 through 151-N (collectively gNB 151).

The UE 105 may comprise any suitable type of device, such as cellular phones, smart phones, tablet devices, Internet of Things (IoT) devices, machine-to-machine (M2M) communication devices, and so on. The number of UE 105 is only limited by the features/capabilities of the many and sometimes differently configured gNB instances within each of many deployed RAN 150.

The RAN 150 may comprise communications node resources using licensed spectrum, unlicensed spectrum such as citizens broadband radio service (CBRS) spectrum, or a combination of licensed and unlicensed spectrum. The RAN 150 may, in various embodiments, include mid-band (e.g., 3.5 GHz) gNBs, low-band (e.g., under 1 GHz) gNBs, or a combination of mid-band and low-band gNBs. In the case of RAN 150 having Citizens Broadband Radio Service Device (CBSD) capability, allocations of CBRS spectrum are provided via a Spectrum Access System (SAS) 170. Generally speaking, the SAS 170 communicates with the 5G core 110 and is configured to control access to the CBRS frequency band for RANs 150, gNB 151, UE 105 and other CBSD devices. Generally speaking, the SAS 170 is configured to ensure that the CBRS frequency band is allocated for CBSD use, and that such use is adapted government requirements, network congestion, network interference and the like.

The various gNB 151 formed at the RAN 150 may be configured with more or fewer resources of the RAN 150 so at to have features and/or capabilities selected in response to the type and number of UE connected to the RAN 150, the type of services being provided thereby, and so on.

The features/capabilities of gNB may be expressed as, illustratively, a number of antennae such as MIMO antennae allocated to a gNB, a gNB deployment type (e.g., strand-based, attached-based, indoor-small business, fixed wireless access, etc.), a backhaul type, a maximum supported user capacity, hardware capability information, software capability information, and/or other information suitable for use in describing gNB supported features and/or capabilities. Further, there are numerous traffic types and device types served by gNB, and each traffic type and/or device type has associated with it various and sometimes differing sets of service requirements such as down link (DL) data speed (DL throughput), up link (UL) data speed (UL throughput), DL data transmission latency, UL data transmission latency, and so on.

Various elements or portions thereof depicted in FIG. 1 and having functions described herein are implemented at least in part as computing devices having communications capabilities, including for example the UE 105, RAN 150, gNB 151, UPF 140, SAS 170 and so on. These elements or portions thereof have computing devices of various types, though generally having a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may comprise computer implemented functions or computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

TCP Slow-Start

Transmission Control Protocol (TCP) is used to manage data communications between the various elements depicted herein with respect to FIG. 1, such as between UE 105 and gNB 151, between UE 105 and AS 160, and so on. Various embodiments contemplate modifications to TCP congestion control mechanisms such as the slow-start mechanism so as to increase data throughput, reduce data loss, and generally improve the network services provided to UE 105.

The TCP "slow-start" algorithm generally functions as follows: Upon receipt of the first communication from a terminal, the network proxy sets an initial congestion window (cwin) indicative of a maximum amount of data (i.e., a maximum number of bytes) that can be transmitted via a connection without being acknowledged (i.e., without an acknowledgement or ACK message being sent from the recipient client). The initial cwin is typically the default Maximum Segment Size (MSS) established for the session, though it can be larger (e.g., 2×, 4×, 10×). The TCP transmitter first sends an initial (small) amount of data toward the receiver, and waits for an acknowledgment (ACK) sent back by the receiver.

Once an ACK is received, the transmitter assumes the network is not congested and doubles the amount of data that will next be sent to the receiver. This process of doubling the size of subsequently transmitted data in response to acknowledged safe reception of same continues until the maximum amount of data is being transmitted at one time and acknowledged ACK, or until the receiving side sends negative acknowledgment (NACK) to the transmitter.

Once a NACK is received (or an ACK for a transmitted packet is not received within an estimated retransmit timeout (RTO) period), the transmitter assumes the network is congested and the process is repeated; that is, the transmitter next transmits data at the initial (small) size and doubling the size of subsequently transmitted data in response to acknowledged safe reception of the data. In other modes of operation, once a NACK is received, rather restarting the process at the initial (small) size, the transmitter simply reduces by half the size of next transmitted data (i.e., an ACK results in a size increase for subsequently transmitted data, which a NACK results in a size decrease for subsequently transmitted data).

Generally speaking, TCP detects congestion when it fails to receive an acknowledgement for a packet within an estimated retransmit timeout (RTO) period. When the network proxy fails to receive an acknowledgement from the client within the RTO period, the network proxy assumes that the data packet that it sent out was lost (i.e., dropped) and that the network channel/link is, therefore, congested. In this instance, the network proxy decreases the congestion window to one maximum segment size (MSS) and retransmits the data packet. Under other conditions, in which the network proxy receives an acknowledgement, it increases the congestion window by one MSS.

FIG. 2 depicts a flow diagram of methods according to various embodiments. Specifically, FIG. 2 depicts methods of adapting TCP operation between UE 105 and RAN 150 in response to increases or decreases in channel capacity related to increases or decreases in a number of beams allocated by RAN 150 to particular UE 105 connected thereto, as well as in response to a CBSD RAN 150 receiving antenna shutdown or power reduction commands from the SAS 170.

At step 210, at each CBSD gNB/eNB being powered on or initialized, the following actions are taken: (1) The CBSD registers with the SAS 170 and receives therefrom a spectrum grant; (2) based on the spectrum grant and the number of UEs 105 being serviced by the CBSD, at least one beam is created for each of the UE 105 connecting thereto; (3) a profile for storing slow-start related information is initialized for each beam servicing a UE TCP upload or TCP download connection; and (4) the CBSD begins providing network services to each UE connected thereto via the one or more beams supporting respective TCP upload and TCP download connections.

Step 210 further contemplates modifying the beam allocations among UEs 105 as appropriate, wherein each new beam allocation is associated with a new SS profile. For example, UEs 105 having greater upload or download data throughput requirements may be allocated more beams than UEs 105 having lower upload or download data throughput requirements. Further, the number of beams allocated to UE may be adapted in response to increases/decreases in the number of UE connected to the CBSD, increases/decreases in relative data throughput requirements of the UE connected to the CBSD, and/or other factors. In various embodiments each newly connected UE receives a single beam at first and additional beams as the data throughput requirements of the UE become known to the CBSD over time (e.g., amount of data transmitted or received by UE over a period of time).

At step 220, at each CBSD gNB/eNB slow-start (SS) related information for each TCP connection or beam is monitored and stored in the relevant SS profile to build thereby respective SS information histories or profiles. The size of the SS profile may be limited in terms of memory usage, time, number of SS initializations, or some other criteria.

The SS related information comprises, illustratively, current SS packet size (e.g., current cwin), a number of ACK and NACK counts associated with the current SS packet, current beam channel quality such as reported by the UE 105, total data carried by the TCP connection or beam in a relevant time period (e.g., number of bytes per reporting period, per predefined time period such as 1 ms, 10 ms, 100 ms and so on), the average modulation used for the TCP connection or beam, and/or the average latency supported by the TCP connection or beam.

At step 230, at each CBSD gNB/eNB for each TCP connection supported by multiple beams may be configured to adapt nominal TCP SS operation to reflect the use of multiple beams to support a TCP connection. Specifically, the number of beams supporting a TCP connection may be used to increase the magnitude of nominal SS packet size adjustments, wherein this increase the magnitude may be limited or dampened in response to the average quality or modulation levels of the beams supporting the TCP connection.

In some embodiments, the nominal SS packet size increase/decrease is scaled according to the number of beams supporting the TCP connection. For example, rather than a TCP connection supported by three beams using a nominal doubling (or other nominal factor as per TCP), the nominal SS packet size increase is adjusted upwards by multiplying the nominal SS packet size increase by an increase multiplier (INC_MULT) of three or some other number related to the number of supporting beams (e.g., # of beams, # of beam/2, and the like). Similarly, rather than the TCP connection supported by three beams using a nominal halving (or other nominal factor as per TCP), the nominal SS packet size decrease is adjusted upwards by multiplying the nominal SS packet size increase by a decrease increase multiplier (DEC_MULT) of three or some other number related to the number of supporting beams (e.g., # of beams, # of beam/2, and the like). The larger the value of INC_MULT or DEC_MULT, the larger the magnitude of the resulting increase or decrease in SS packet size in the adapted SS routing used by a TCP connection.

In some embodiments, the size (magnitude) of SS packet size increase is reduced in response to the average beam modulation exceeding a first threshold level (e.g., 50%, 75%, 95% of typical or maximum utilization level, nominal channel capacity, or quality indicator such as BER or congestion level, etc.). For example, if the modulation is 16 QAM, then the size of SS packet will be doubled (×2), if the modulation is 64 QAM, the size of the SS packet will be quadrupled (×4), and so on for QAM and other modulation techniques.

In some embodiments, the size (magnitude) of a packet size decrease is reduced in response to the average beam modulation being below a second threshold level (the first and second threshold levels may be the same or may be different). For example, if the modulation is below a threshold which is 64 QAM, the size of SS packet will be reduced by half, and so on for QAM and other modulation techniques.

At step 230, at each CBSD gNB/eNB receiving a power down message form the SAS 170, prior to powering down the relevant antennas the CBSD gNB/eNB operates to: (1) identify connected UE (and respective beam(s) and SS profiles), and retrieve from respective SS profile(s) the corresponding last successful TCP SS packet size and channel quality (e.g., high number of ACKS, no NACKs) for upload (UL) and download (DL) TCP connections; (2) maintain the DL TCP connections to each UE at the SS packet size corresponding to the last successful DL TCP SS packet size until the respective DL buffers at the CBSD gNB/eNB are empty; and (3) maintain the UL TCP connections from each UE at the SS packet size corresponding to the last successful UL TCP SS packet size until the respective UL buffers at the UE are empty (e.g., transmit a message to all connected UEs causing them to use the UL TCP SS packet size until their UL buffers are empty); and (4) power down CBSD antennas used to form beams for each UE having been processed according to steps (2)-(3).

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A computerized method for adapting Transmission Control Protocol (TCP) operation between a provider equipment (PE) node apparatus and a plurality of computerized user devices in data communication with the PE node apparatus, the computerized method comprising:
   receiving, at the PE node apparatus, a spectrum grant;
   based on the spectrum grant and a number of the plurality of computerized user devices being serviced by the PE node apparatus, creating at least one beam for each of the plurality of computerized user devices;
   initializing data representative of at least one profile for storing slow-start (SS)-related information for each beam of the at least one beam servicing a TCP upload or TCP download connection;
   providing network services to each of the plurality of computerized user devices via the each beam of the at least one beam supporting the respective TCP upload and TCP download connections; and
   modifying beam allocations among the plurality of computerized user devices;
   wherein the modifying of the beam allocations among the plurality of computerized user devices comprises initially allocating a single beam to each of the plurality of computerized user devices which are newly connected to the PE node apparatus and thereafter, allocating additional beams as data throughput requirements of the newly connected computerized user devices become known to the PE node apparatus over time.

2. The computerized method of claim 1, further comprising causing registration of the PE node apparatus with a spectrum access system (SAS), wherein the receiving of the spectrum grant comprising receiving the spectrum grant based on the registration.

3. The computerized method of claim 1, wherein the modifying of the beam allocations among the plurality of computerized user devices further comprises allocating more beams to one or more of the plurality of computerized user devices having greater upload or download data throughput requirements than to one or more of the plurality of computerized user devices having lower upload or download data throughput requirements.

4. The computerized method of claim 1, wherein the modifying of the beam allocations among the plurality of computerized user devices further comprises modifying the beam allocations based on at least one of: (i) increases or decreases in a number of the plurality of computerized user devices connected to the PE node apparatus, or (ii) increases or decreases in relative data throughput requirements of the plurality of computerized user devices connected to the PE node apparatus.

5. The computerized method of claim 1, further comprising:
   monitoring the SS-related information for each beam; and
   storing the SS-related information in the at least one profile.

6. The computerized method of claim 5, wherein the monitoring of the SS-related information comprises monitoring data related to one or more of the following: SS packet size; a number of ACK and NACK counts associated with a SS packet; beam channel quality; total data carried by the TCP connection or beam in a prescribed time period; and average modulation used for the TCP connection or beam; or an average latency supported by the TCP connection or beam.

7. A computerized method for adapting Transmission Control Protocol (TCP) operation between a provider equipment (PE) node apparatus and a plurality of computerized user devices in data communication with the PE node apparatus, the computerized method comprising:
receiving, at the PE node apparatus, a spectrum grant;
based on the spectrum grant and a number of the plurality of computerized user devices being serviced by the PE node apparatus, creating at least one beam for each of the plurality of computerized user devices;
initializing data representative of at least one profile for storing slow-start (SS)-related information for each beam of the at least one beam servicing a TCP upload or TCP download connection;
providing network services to each of the plurality of computerized user devices via the each beam of the at least one beam supporting the respective TCP upload and TCP download connections; and
for each TCP connection supported by multiple beams, adapting nominal TCP SS operation to reflect a use of the multiple beams to support the TCP connection.

8. The computerized method of claim 7, wherein the adapting the nominal TCP SS operation to reflect the use of the multiple beams to support the TCP connection comprises utilizing a number of beams supporting the TCP connection to increase a magnitude of nominal SS packet size adjustments.

9. The computerized method of claim 8, wherein the increase of the magnitude is limited or dampened based on an average quality or respective modulation levels of the multiple beams supporting the TCP connection.

10. The computerized method of claim 7, wherein the adapting the nominal TCP SS operation to reflect the use of the multiple beams to support the TCP connection comprises scaling an increase or decrease in nominal SS packet size according to a number of the multiple beams supporting the TCP connection.

11. The computerized method of claim 7, wherein the adapting the nominal TCP SS operation to reflect the use of the multiple beams to support the TCP connection comprises increasing an SS packet size by a first magnitude, the first magnitude based on how much an average beam modulation exceeds a first threshold level.

12. The computerized method of claim 11, wherein the adapting the nominal TCP SS operation to reflect the use of the multiple beams to support the TCP connection comprises reducing an SS packet size by a second magnitude, the second magnitude based on how much an average beam modulation is below a second threshold level.

13. A computerized method for adapting Transmission Control Protocol (TCP) operation between a provider equipment (PE) node apparatus and a plurality of computerized user devices in data communication with the PE node apparatus, the computerized method comprising:
receiving, at the PE node apparatus, a spectrum grant;
based on the spectrum grant and a number of the plurality of computerized user devices being serviced by the PE node apparatus, creating at least one beam for each of the plurality of computerized user devices;
initializing data representative of at least one profile for storing slow-start (SS)-related information for each beam of the at least one beam servicing a TCP upload or TCP download connection;
providing network services to each of the plurality of computerized user devices via the each beam of the at least one beam supporting the respective TCP upload and TCP download connections;
receiving a power down message from spectrum access system (SAS);
prior to powering down antennas of the PE node apparatus:
(i) retrieving, from respective profiles of the at least one profile associated with the plurality of computerized user devices, corresponding last successful TCP SS packet size, channel quality, and download (DL) TCP connections;
(ii) maintaining the DL TCP connections to each the plurality of computerized user devices at the SS packet size corresponding to the last successful DL TCP SS packet size until respective DL buffers at the PE node apparatus are empty; and
(iii) maintaining upload (UL) TCP connections from each of the plurality of computerized user devices at an SS packet size corresponding to a last successful UL TCP SS packet size until respective UL buffers at the plurality of computerized user devices are empty; and
causing a power down the antennas used to form beams for each of the plurality of computerized user devices having been processed according to (ii) and (iii) above.

14. The computerized method of claim 13, further comprising transmitting a message to all connected ones of the plurality of computerized user devices causing the all connected ones of the plurality of computerized user devices to use the UL TCP SS packet size until the respective UL buffers thereof are empty.

15. The computerized method of claim 13, wherein the receiving of the power down message from the SAS comprises receiving a message relating to at least one of a Citizens Broadband Radio Service Device (CBSD) shutdown command or spectrum grant withdrawal.

16. The computerized method of claim 13, wherein the PE node apparatus comprises a Citizens Broadband Radio Service Device (CBSD).

17. A computerized method for adapting Transmission Control Protocol (TCP) operation between a provider equipment (PE) node apparatus and a plurality of computerized user devices in data communication with the PE node apparatus, the computerized method comprising:
receiving, at the PE node apparatus, a spectrum grant;
based on the spectrum grant and a number of the plurality of computerized user devices being serviced by the PE node apparatus, creating at least one beam for each of the plurality of computerized user devices;
initializing data representative of at least one profile for storing slow-start (SS)-related information for each beam of the at least one beam servicing a TCP upload or TCP download connection;
providing network services to each of the plurality of computerized user devices via the each beam of the at least one beam supporting the respective TCP upload and TCP download connections; and
for each of the TCP download connections supported by more than one beam of a wireless channel, modifying a corresponding TCP slow start mechanism via increasing an initial slow start packet size and increasing in a slow start packet size increment;
wherein:
the increasing of the initial slow start packet size comprises multiplying a nominal slow start packet size by a number of wireless channel beams which support the respective TCP download connections; and the increasing of the slow start packet size increment comprises multiplying a nominal slow start packet size increment by the number of the wireless channel beams.

18. A computerized method for adapting Transmission Control Protocol (TCP) operation between a provider equipment (PE) node apparatus and a plurality of computerized user devices in data communication with the PE node apparatus, the computerized method comprising:

receiving, at the PE node apparatus, a spectrum grant;

based on the spectrum grant and a number of the plurality of computerized user devices being serviced by the PE node apparatus, creating at least one beam for each of the plurality of computerized user devices;

initializing data representative of at least one profile for storing slow-start (SS)-related information for each beam of the at least one beam servicing a TCP upload or TCP download connection;

providing network services to each of the plurality of computerized user devices via the each beam of the at least one beam supporting the respective TCP upload and TCP download connections; and based on a requirement to cease transmitting on a wireless channel which supports a current Transmission Control Protocol (TCP) connection with a computerized user device of the plurality of computerized user devices:
(i) transmitting data representative of a message to the computerized user device, the data representative of a message configured to cause the computerized user device to continue transmitting currently buffered uplink (UL) data to the PE node apparatus via the TCP upload connection using a corresponding last successful TCP congestion window (cwin) size; and
(ii) transmitting currently buffered downlink (DL) data from the PE node apparatus to the computerized user device via the TCP download connection using a corresponding last successful TCP cwin size.

19. The computerized method of claim 18, wherein the PE node apparatus comprises a Citizens Broadband Radio Service Device (CBSD).

20. The computerized method of claim 18, wherein the initializing of the data representative of the at least one profile for the storing of the SS-related information for each beam of the at least one beam servicing the TCP upload or TCP download connection storing the respective corresponding last successful TCP cwin size for each beam of the at least one beam in the at least one profile.

* * * * *